United States Patent [19]

Moore

[11] 3,778,068

[45] Dec. 11, 1973

[54] PHONOGRAPH RECORD INTERLOCKING MEANS

[76] Inventor: Glen T. Moore, 405 W. 57th St., New York, N.Y. 10019

[22] Filed: Oct. 2, 1972

[21] Appl. No.: 294,256

[52] U.S. Cl. ................................ 274/42 R, 274/1 R

[51] Int. Cl. ................................ G11b 3/00

[58] Field of Search ................................ 274/42, 1 R

[56] References Cited

UNITED STATES PATENTS

| | | | |
|---|---|---|---|
| 3,540,737 | 11/1970 | Borthwick | 274/42 R |
| 2,906,536 | 9/1959 | Maverhoff | 274/42 R |
| 2,544,010 | 3/1951 | DiFiannantonio | 274/42 R |

*Primary Examiner*—Harry N. Haroian

*Attorney*—I. Jordan Kunik

[57] ABSTRACT

Applied to or formed on the label portion of the phonograph disc is a plurality of spaced apart ridges in substantially parallel array. When two phonograph records rest flat one upon the other on a phonograph turntable, rotating slippage of the upper record relative to the lower record is prevented by virtue of the ridges on adjacent records engaging each other angularly so that the rotation of the lower record causes the rotation of the upper record. The ridges may also be mounted on records by way of a thin, flexible plastic disc on the upper surface of which is applied or formed the array of spaced redges. The plastic disc is applied to the label area of the record by means of a pressure-sensitive adhesive or other suitable means.

9 Claims, 6 Drawing Figures

PHONOGRAPH RECORD INTERLOCKING MEANS

BACKGROUND OF THE INVENTION

1. FIELD OF THE INVENTION:

This invention relates to phonograph records and, more particularly, to means either integrally formed or applied upon the records to prevent rotating slippage between adjacent records on a rotating stack mounted on a phonograph turntable. The invention is particularly applicable to automatic record changers where a reserve stack of records is suspended above the turntable and wherein the bottom record in said stack is intermittently released to be dropped upon the turntable for playing the recording. The present invention not only provides for interlocking engagement of adjacent records on the stack on the rotating turntable but also permits requisite lateral slippage on the part of the bottom record relative to the suspended reserve stack in order to be released by the escapement mechanism on the spindle of the turntable.

2. DESCRIPTION OF THE PRIOR ART:

Phonograph record interlocking means have been disclosed in such U.S. Pats. as 2,559,786, 2,600,573, 2,776,837, 3,051,496, and 3,360,271, for example. Although the interlocking mechanisms shown in these patents may have been effective in preventing slippage between the top record and the next adjacent record in a stack on a rotating turntable, these expedients would prevent their being used on an automatic phonograph where an escapement mechanism releases a single record at a time from a reserve stack of records suspended above the playing records on the phonograph spindle. The escapement mechanisms require that the bottom record to be released and dropped upon the turntable must slide laterally relative to the next adjacent upper record and this action would be prevented by the interlocking means disclosed in these previous patents where the interlocking means are operative only when the records are coaxially aligned and where they would mechanically prevent any lateral displacement between adjacent records.

SUMMARY OF THE INVENTION

In order to obviate the disadvantages of the prior art devices, the present invention discloses an interlocking means that may be integrally formed or applied upon phonograph records and which provide not only for rotational engagement between adjacent stacked records but also permit the lateral slippage between adjacent records when they are suspended in a reserve stack on a phonograph spindle having an escapement mechanism for releasing one record at a time to drop upon the phonograph turntable or upon the record previously positioned thereon.

Accordingly, the invention comprises a plurality of elongated ridges or bosses in spaced parallel array on the circular label portion of the phonograph record, said bosses on the face of one record becoming angularly engaged with the bosses on the face of the next adjacent record to cause the positive rotation of the engaged record. When the ridges on adjacent records are engaged for rotation, they prevent slippage that otherwise occurs between records and consequent distortion of sound reproduction.

Since the ridges are spaced apart so that they can be placed in alternating array relative to the ridges on an adjacent record, there is adequate space therebetween to permit the requisite lateral slippage necessary to release the bottom record from the automatic spindle in order for it to drop to the phonograph turntable. Notwithstanding this lateral slippage, the present invention also helps to prevent the release of more than one record at a time from the reserve stack of records supported on the upper portion of the phonograph spindle.

DESCRIPTION OF THE PREFERRED EMBODIMENTS

Figure 1:
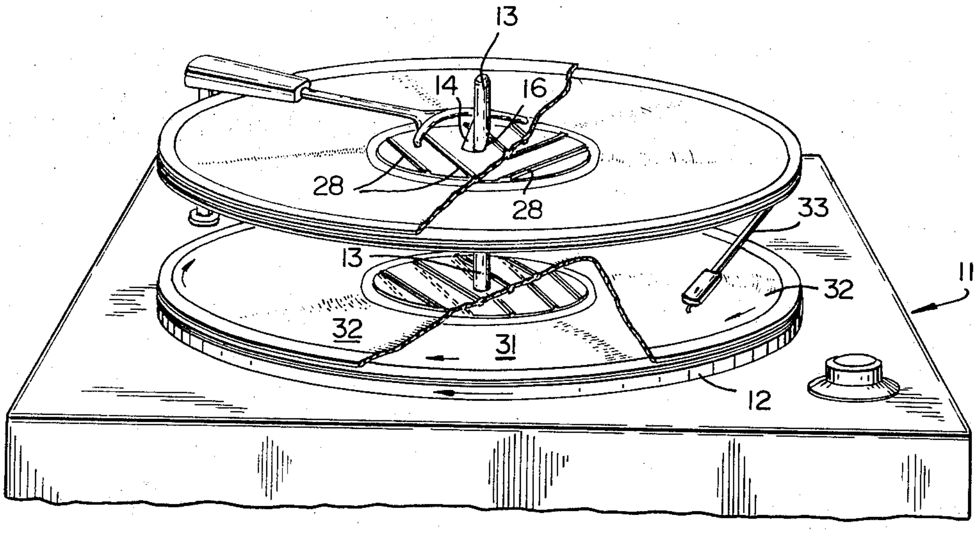
FIG. 1 is a perspective view of a portion of an automatic phonograph showing some phonograph records in a playing position on the turntable and other records being supported on an automatic record changer.

Referring now to the drawing in detail, there is shown in FIG. 1 a fragmentary portion of a phonograph deck, generally designated 11. Mounted on and rotatable in a plane parallel to said deck, by means well known in the art, is a phonograph turntable 12 which has a central aperture through which a vertically extending nonrotating spindle 13 freely extends. Turntable 12 is operated either by a synchronous motor or by other means such as gear mechanisms or by pulleys, in accordance with various systems well known in the art.

The upper portion of spindle 13 has on one side a wedge-shaped downwardly and outwardly extending wing 14. On the other side, 180° apart, spindle 13 has an angled recess 16 whose inward slope is similar to the outward slope of wing 14. The lower portion of recess 16 is bounded by a horizontal ledge 17 upon which a portion of a suspended out-of-play record 18 rests.

Spindle 13 has a diagonal slot within which a lever 19 is pivotally movable by means of well known mechanical and timing elements, not shown, which are located within the interior of deck 11 and which extend through the interior of spindle 13.

Figures 5, 6:
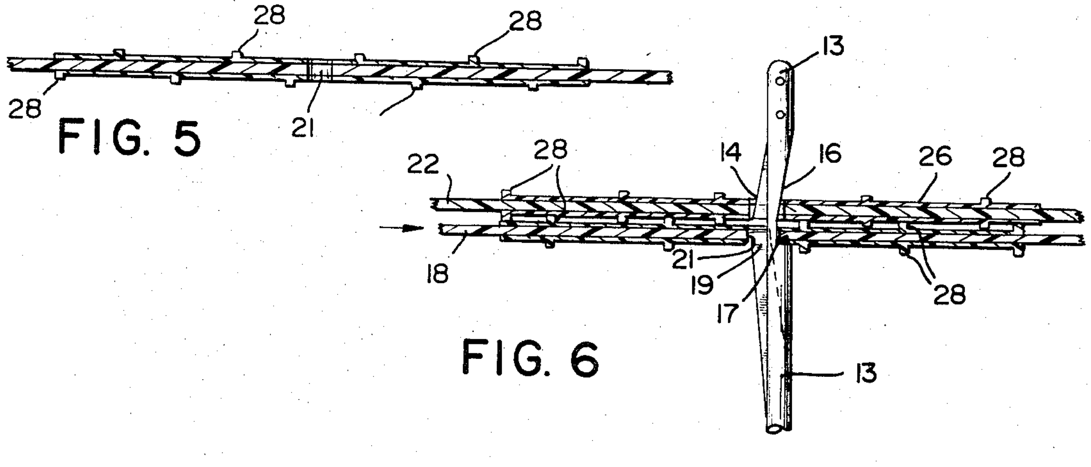
FIG. 5 is similar to FIG. 4 showing a staggered alignment of the ridges on the top and bottom of the record.
FIG. 6 is a somewhat enlarged fragmentary detailed view of the manner in which two records are suspended in out-of-play position on the automatic record changing phonograph spindle.

As shown in FIG. 6, lever 19 is normally urged into its outward angled position whereby the upper end thereof extending at least partially into the center aperture 21 of record 18, causes the latter to be located off-center from the longitudinal axis of spindle 13 so that said record is constrained to rest upon ledge 17.

When record 18 is to drop upon turntable 12, the automatic record changing mechanism causes lever 19 pivotally to enter into its slot whereby its upper portion bears against the opposite side of aperture 21 to move record 18 laterally along ledge 17 until said aperture becomes axially aligned with spindle 13 at which location record 18 drops down to turntable 12 to be played.

As soon as record 18 is released, lever 19 returns promptly ot its outwardly extended position where, in conjunction with ledge 17, it causes the retention, in reserve, of record 22. Record 22 is caused to assume a position off-center from the axis of spindle 13 by the action of wing 14 which in conjunction with recess 16 causes the slight lateral movement of said record into the next reserve position on ledge 17 and maintained thereon by lever 17.

Figure 2:
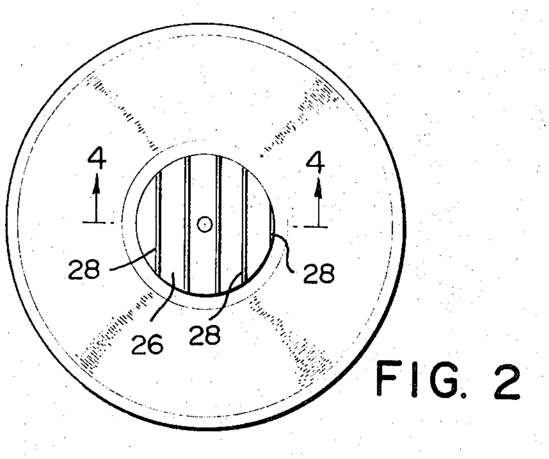
FIG. 2 is a top view of a phonograph record showing the interlocking ridges of the present invention placed in the label area of the record.
Figure 3:
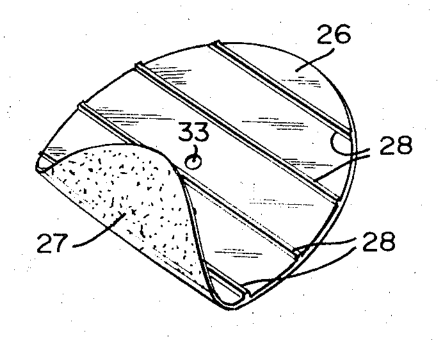
FIG. 3 is a perspective view of a disc on which the ridges are formed, with a portion thereof flexibly reversed to show the pressure-sensitive adhesive on the bottom surface thereof.

One embodiment of the record interlocking means herein comprises a circular disc 26 that is made of thin, flexible plastic which is preferably transparent or translucent. The bottom surface of disc 26 may be coated with a tacky pressure-sensitive adhesive 27 which permits the application of the disc to the label portion of the phonograph record as shown in FIGS. 1 and 2. Since disc 26 is either transparent or translucent, the legends or other information usually printed upon the record label can readily be viewed by the person handling the phonograph record after said disc has been applied thereto.

Formed integrally or otherwise applied on the top surface of each circular disc 26 is an array of spaced substantially parallel ridges 28 that are raised slightly above the surface of said disc. The cross-section profile of ridges 28 may take any suitable form whereby the ridges on the bottom face of an upper record are engaged by the corresponding similar ridges on the upper face of the lower adjacent record whereby the latter causes the rotation of the former.

Figure 4:
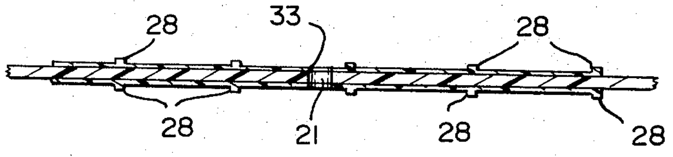
FIG. 4 is a fragmentary section view taken on line 4—4 of FIG. 2 wherein the ridges on the top and bottom of the phonograph record are aligned with each other.

Preferably, ridges 28 should have a rectangular profile or cross-section as shown in FIGS. 4, 5 and 6, whereby a positive grasping action can take place between adjacent and opposing ridges as they are caused to become angled relative to each other as shown on the cutaway portion of two records 31 and 32 on turntable 12 in FIG. 1.

While ridges 28 are arrayed in substantially parallel formation on disc 26, they are not arrayed symmetrically relative to the central aperture 33 thereof. If ridges 28 were arrayed symmetrically relative to aperture 33, the ridges of adjacent records would not interlock because the ridges of one disc would simply slide around and on top of the ridges of the adjacent disc. Ridge 28 closest to aperture 33 should be spaced apart therefrom approximately ⅛ or more. In order to ensure the interlocking action between the sets of ridges on adjacent faces of juxtaposed discs in stacked arrangement as shown in FIG. 6, it is simply necessary to provide for the misalignment or alternation of ridges 28 on record 18 relative to ridges 28 on record 22.

When the records have sequentially dropped upon turntable 12 to assume the respective positions of records 31 and 32, as shown in FIG. 1, the frictional drag induced by the weight of pick-up arm 33 and the phonograph stylus therein playing top record 32 normally might cause slippage between the record being played and the record directly beneath. By virtue of the presence of ridges 28 on the opposing faces of the adjacent records, a slight angular movement between record 32 and record 31 will cause the respective opposing ridges on adjacent records to assume an angled relationship therebetween as shown in the dotted outline portion in FIG. 1, whereby positive interlocking engagement between the ends of respective ridges 28 prevent any slippage between adjacent records thereby ensuring rotation of all the records on turntable 12. There is only a minimal amount of angular lost motion that occurs when adjacent records rotate relative to each other prior to coming into interlocking engagement.

Elongated bosses or ridges 28 may be formed integrally upon the center label portions of both faces of each record as originally manufactured with the requisite information, legends, and identification being imprinted upon the center label section in the space between said bosses with due accommodation to said ridges.

Alternatively, the ridges may be applied to the records after they have been manufactured and sold to the consumer by having the purchaser obtain a number of thin, flexible plastic discs 26 upon which, in one embodiment, the ridges have been either applied separately in the form of strips of plastic, or the like, by means of suitable adhesives or heat sealing. In another embodiment, the ridges may be formed integrally in the thin, plastic disc material either by extrusion, embossing, molding, or stamping. The bottom surfaces of these discs 26 may have a pressure-sensitive adhesive 27 applied thereto over which the well known peel-off protective paper may be mounted for the purpose of convenient production, handling, and merchandising. The purchaser of the discs can then peel off the backing paper, exposing the pressure-sensitive adhesive after which the disc 26 is applied to the label portion of the record and pressed into position. The type of adhesive selected would be such that it will resist the torsion to which the disc will be subjected when ridges 28 are engaged and interlocked on adjacent records.

Alternatively, pressure-sensitive adhesive 27 on the bottom surface of disc 26 may be replaced by a thin layer of foam rubber or polyurethane foam bonded to the bottom surface of said disc. In this embodiment, when records are stacked on the reserve portion of the spindle, the interlocking discs are simply placed between each adjacent pair of records whereby the polyurethane foam has the self-gripping characteristics for preventing the rotation of the disc relative to the phonograph record. The same parallel array of ridges 28 on top of the foambonded disc would perform the same function as described hereinbefore.

The parallel array of spaced ridges 28 perform the two requisite functions for automatic record changing phonograph machines where rotational interlocking between adjacent records must take place to prevent rotational slippage between records while, at the same time, slight lateral slippage between adjacent records can take place when a single record on the bottom of the reserve stack of records is to be moved laterally in order to descend axially on the turntable spindle when dropping to a playing position.

Although the present invention has been described with reference to particular embodiments and examples, it will be apparent to those skilled in the art that variations and modifications can be substituted therefor without departing from the principles and true spirit of the invention. The "Abstract" given above is for the convenience of technical searchers and is not to be used for interpreting the scope of the invention or claims.

I claim:

1. Interlocking means for phonograph records comprising a plurality of spaced, raised, substantially parallel ridges on the center label portion of a record, said ridges being arrayed off-center fom the axial center of the record.

2. Interlocking means for phonograph records according to claim 1 wherein the edges of said ridges are substantially perpendicular to the plane of the record.

3. Interlocking means for phonograph records comprising a disc, adhesive means for applying and securing said disc to the center label portion of a phonograph record, and a plurality of raised ridges in spaced parallel array on the top surface of said disc, said array being located eccentrically from the axial center of said disc and of said record.

4. Interlocking means for phonograph records according to claim 3 wherein said ridges are in the form of strips applied on the top surface of said disc.

5. Interlocking means for phonograph records according to claim 3 wherein said ridges are intergrally formed on said disc.

6. Interlocking means for phonograph records according to claim 3 wherein the edges of said ridges are substantially perpendicular to the plane of said disc.

7. Interlocking means for phonograph records according to claim 3 wherein said disc is made of a transparent plastic flexible material.

8. Interlocking means for phonograph records according to claim 3 and further comprising a pressure-sensitive adhesive material on the bottom surface of said disc.

9. Interlocking means for phonograph records according to claim 3 and further comprising a thin layer of foam material bonded to the bottom of said disc, said foam material having functional characteristics for preventing the rotation of said disc relative to said record.

* * * * *